Figure 1:
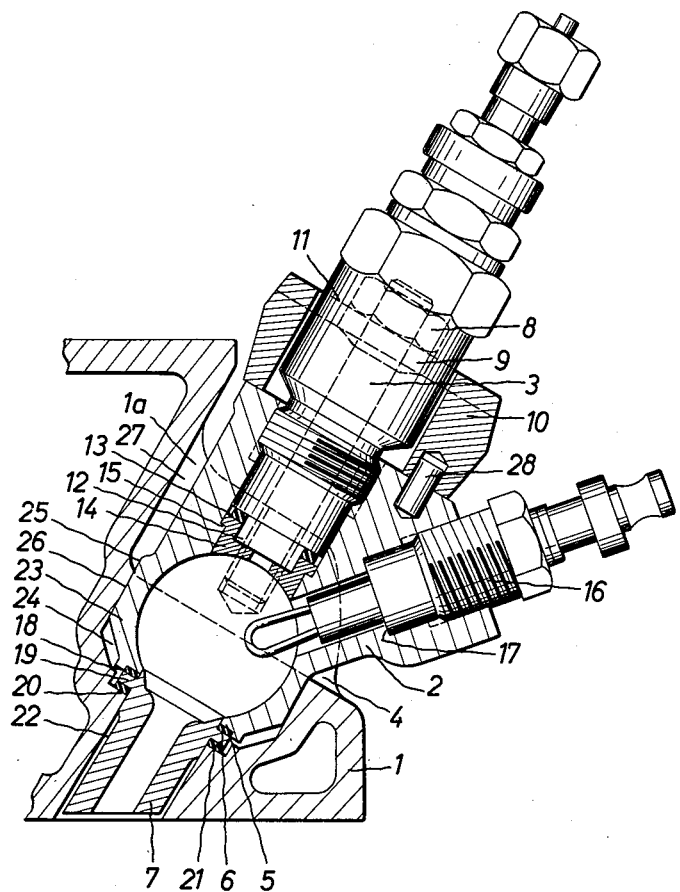

Oct. 16, 1962  F. ESPENSCHIED  3,058,452
INTERNAL COMBUSTION ENGINES
Filed March 14, 1960  2 Sheets-Sheet 1

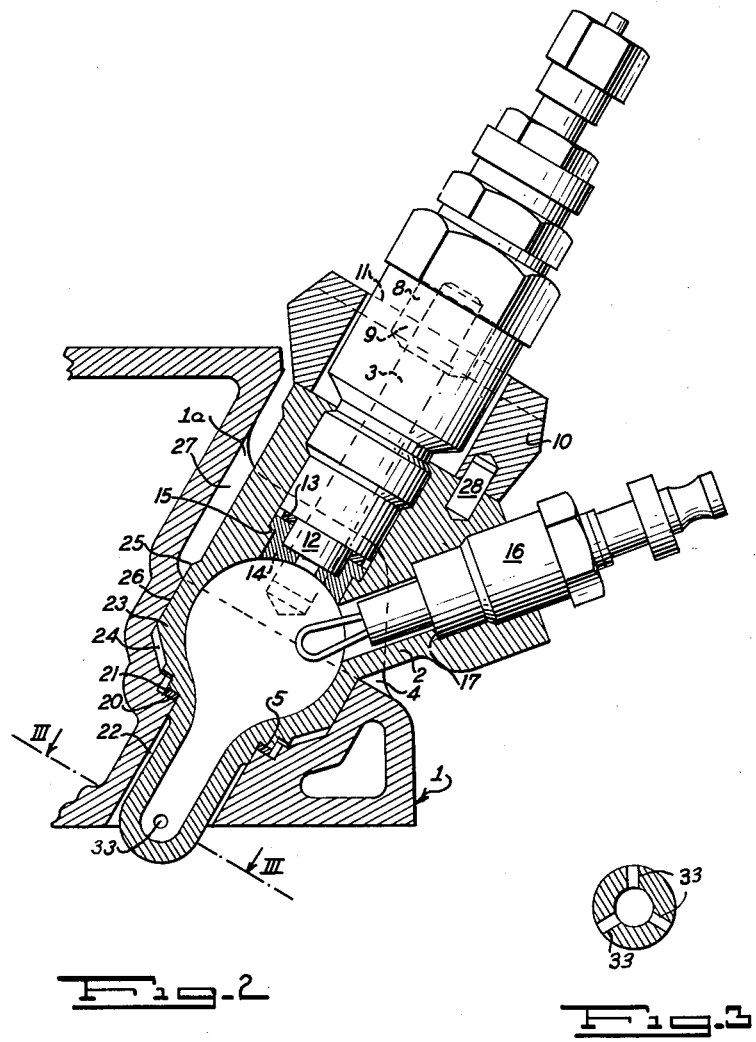

3,058,452
INTERNAL COMBUSTION ENGINES
Friedrich Espenschied, Mannheim, Germany, assignor to Motoren-Werke Mannheim A.G. vorm. Benz Abt. Stat. Motorenbau, Mannheim, Germany, a German company
Filed Mar. 14, 1960, Ser. No. 14,900
Claims priority, application Germany Mar. 14, 1959
5 Claims. (Cl. 123—32)

The invention relates to a combustion chamber mounting for water-cooled diesel engines, which accommodates an injection nozzle and heater plug and is connected to the cylinder space by one or more constricted passage orifices, fixing means engaging the cylinder head pressing the combustion chamber mounting by its end face in the vicinity of the passage orifice or orifices against a counter-face on the cylinder head or against the end face of a burner insert containing the passage orifice or orifices.

The known combustion chamber mountings are constructed as bodies of revolution and are enclosed on all sides by the water-cooled walls of the cylinder head. An air gap is often provided between the wall parts of the mounting forming the actual combustion chamber and the surrounding cylinder head walls. In the vicinity of the injection nozzle the cylinder head walls are in heat-conducting contact with the known combustion chamber mountings, and to some extent the nozzle seat is even washed directly by the cooling water. Whereas the injection nozzle is inserted in the mounting, the heater plug is screwed into the cylinder head and projects into the combustion chamber through an opening in the mounting. This known construction gives rise to sealing difficulties, since the opening for the heater plug connects the interior of the combustion chamber with the aforesaid air gap, which in consequence must be sealed from the outside. This sealing is effected by means of a soft copper ring of circular cross section, which should not interfere with the free thermal expansion of the mounting. Sealing becomes particularly difficult if the nozzle seat is washed by the cooling water, since the rubber rings necessary in this case for sealing the cooling water space must not come into contact with the hot combustion chamber contents.

The above-mentioned disadvantages are obviated according to the invention by the combustion chamber mounting being accommodated in a substantially open lateral pocket of the cylinder head. It is thereby possible to screw the heater plug directly in the combustion chamber mounting, thereby eliminating the above-mentioned sealing difficulties. It is true that combustion chamber mountings, bolted separately to the cylinder head, have already been used in air-cooled diesel engines, but these mountings were situated in the cooling air stream and were provided with cooling fins. The application of a combustion chamber mounting completely separate from the cylinder in the case of water-cooled diesel engines, in which no cooling air stream impinges on the mounting is contrary to existing technical belief which heretofore has always assumed that heat-conducting contact of the nozzle seat with the cylinder head wall could not be dispensed with, since there was a fear that otherwise the injection nozzle could become overheated and carbonized. It has been found that this fear is unfounded and that the heat produced mainly at the passage orifice and in the actual combustion chamber in case of need can also be led off through heat-conducting contact of a part of the cylindrical external surface of the mounting with a counter-bore in the cylinder head, situated between the heater plug and sealing surface.

A constructional example of the invention is shown in section in the accompanying drawing wherein:

FIG. 1 is a view partly in section of a first embodiment of the invention;
FIG. 2 is a view partly in section of a further embodiment of the invention in which the annular face of the auxiliary chamber is directly on and in fluid-tight relation with a shoulder on the cylinder head; and
FIG. 3 is a sectional view along the line III—III of FIG. 2.

The combustion chamber mounting or auxiliary chamber 2 is inserted in the cylinder head 1 of a water-cooled diesel engine. End face 5 of the mounting 2 is pressed against the end face 6 of the burner insert 7 by means of two stud bolts 3 screwed into projections 4 of the cylinder head 1. The cylinder head 1 with the projections 4 forms a substantially open lateral pocket 1a. Screwed on to the stud bolts 3 are nuts 8, which transmit the application pressure by means of the ball washer 9 and the bridge 10 to the combustion chamber mounting 2. Screwed into the combustion chamber mounting 2 is the nozzle holder 11, which presses the injection nozzle 12 against a housing shoulder 15 by means of a packing ring 13 and nozzle protection 14. Also screwed into the combustion chamber mounting 2 is the heater plug 16, which bears tightly against the housing shoulder 17. Between the end faces 5 and 6 of the combustion chamber mounting 2 and of the burner insert 7, respectively, is a sealing ring 18. Between the collar 19 and the sealing face 20 of the cylinder head 1 is the sealing ring 21. As shown, the burner insert 7 may be thermally insulated from the cylinder head 1 by an air gap 22, which is about $1\tfrac{2}{10}$ mm. wide. It may, however, if this is appropriate to the particular combustion process employed, be in heat-conducting contact with the cylinder head 1. The invention is not restricted to the use of the burner insert shown. Other insert types, having one or more passage orifices, may also be used. FIGS. 2 and 3 show a burner insert having a plurality of orifice passages 33. The burner insert may also be integral with the combustion chamber mounting as seen in FIG. 2. The part 23 adjacent the end face 5 is thermally insulated from the cylinder head 1 by the air gap 24, which is about 1–2 mm. wide. The cylindrical outer surface 25, representing a fraction of the total surface of the combustion chamber mounting 2, is in heat-conducting contact with a counter-bore 26 of the cylinder head 1. The counter-bore 26 adjoins the pocket 1a. The fit between the parts 25 and 26 corresponds to a sliding fit or running fit. This applies to a stroke volume of 0.6 to 0.7 litre per cylinder. With smaller stroke volumes, either a wider fit may be provided at this place, or the bore 26 may be omitted. The other parts of the combustion chamber mounting 2 are thermally insulated from the cylinder head 1 and from the projections 4 by an air gap 27 several millimetres wide. The stud 28 insures correct assembly position of the combustion chamber mounting 2.

Cooling of the combustion chamber mounting is effected mainly by dissipation of heat at the place of contact of parts 25 and 26 and by conduction and radiation at the remaining exposed parts of the mounting and nozzle holder 11. The temperature of the injection nozzle is then low enough to ensure carbonization-free operation of a pin nozzle.

What is claimed is:
1. In an internal combustion engine of the liquid cooled, liquid fuel injection compression ignition type, a cylinder, a piston slidable in said cylinder, a liquid cooled cylinder head, a cylinder space defined by said cylinder and piston and said cylinder head, an auxiliary chamber having walls the interior surfaces of which define said chamber, said chamber being detachably fixed on said cylinder head, an insert clamped between said auxiliary chamber and said cylinder head, said insert having a passageway connecting said cylinder space with the interior of said auxiliary chamber, a collar on said insert and integral therewith, a shoulder on said cylinder head and adjacent one side of said collar, an annular face on said auxiliary chamber and adjacent the other side of said collar, fixing means securing said cylinder head and said auxiliary chamber together and pressing said annular face towards said shoulder whereby said collar is gripped therebetween, an injection nozzle mounted in the walls of said chamber at a location opposite said annular face, a projection on said chamber and beside said nozzle, a heater plug inserted in a bore of said projection, said cylinder head forming a pocket arranged eccentrically with respect to said cylinder, said pocket being open at least in the vicinity of said projection, said shoulder lying on the bottom of said pocket, said pocket having a cylindrical wall integral with said cylinder head, the auxiliary chamber walls forming an exterior cylindrical surface extending at least over one half of the distance between said annular face and said projection, said exterior cylindrical surface being in heat conducting contact with said cylindrical wall, said projection and said heater plug projecting substantially from said pocket.

2. An internal combustion engine according to claim 1, wherein said insert has a plurality of passages connecting said cylinder space and said interior of said auxiliary chamber.

3. In an internal combustion engine of the liquid cooled, liquid fuel injection compression ignition type, a cylinder, a piston slidable in said cylinder, a liquid cooled cylinder head, a cylinder space defined by said cylinder head, an auxiliary chamber having walls the interior surfaces of which define said chamber, the chamber being detachably fixed on said cylinder head, said auxiliary chamber having a passageway connecting said cylinder space with said interior, said passageway having walls, said walls of said passageway being thermally insulated from said cylinder head on the major part of their external surface, said auxiliary chamber having on its outside an annular face formed by its walls and disposed in the vicinity of said passaegway, a shoulder on said cylinder head and in fluid-tight co-operation with said face, fixing means securing said cylinder head and said auxiliary chamber together and pressing said annular face towards said shoulder, an injection nozzle mounted in said chamber walls opposite said annular face, a projection on said chamber and beside said nozzle, a heater plug inserted into a bore of said proejction, said cylinder head forming a pocket arranged eccentrically with respect to said cylinder, said pocket being open at least in the vicinity of said projection, said shoulder lying on the bottom of said pocket, said pocket having a cylindrical wall integral with said cylinder head, the auxiliary chamber walls forming an exterior cylindrical surface extending at least over one half of the distance between said annular face and said projection, said exterior cylindrical surface being in heat conducting contact with said cylindrical wall, said projection and said heater plug projecting substantially from said pocket.

4. An internal combustion engine according to claim 3, wherein said auxiliary chamber has a plurality of passageways connecting said cylinder space and said interior of said auxiliary chamber.

5. An internal combustion engine according to claim 3, wherein a packing ring is interposed between said annular surface and said shoulder.

References Cited in the file of this patent

UNITED STATES PATENTS

| 2,058,827 | Ricardo | Oct. 27, 1936 |
| 2,120,768 | Ricardo | June 14, 1938 |

FOREIGN PATENTS

| 1,097,913 | France | Feb. 23, 1955 |
| 133,793 | Austria | June 10, 1933 |
| 495,423 | Italy | June 15, 1954 |
| 915,320 | France | July 22, 1946 |
| 784,481 | Great Britain | Oct. 9, 1957 |